United States Patent
Bantz et al.

(10) Patent No.: US 8,271,966 B2
(45) Date of Patent: Sep. 18, 2012

(54) METHODS AND APPARATUS FOR PATCHING SOFTWARE IN ACCORDANCE WITH INSTITUTED PATCHING POLICIES

(75) Inventors: David F. Bantz, Portland, ME (US); Thomas E. Chefalas, Somers, NY (US); Steven J. Mastrianni, Unionville, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 12/133,546

(22) Filed: Jun. 5, 2008

(65) Prior Publication Data
US 2008/0235678 A1   Sep. 25, 2008

Related U.S. Application Data

(63) Continuation of application No. 11/333,064, filed on Jan. 17, 2006, now abandoned.

(51) Int. Cl.
*G06F 9/44* (2006.01)
(52) U.S. Cl. ........ 717/168; 717/127; 717/171; 717/176; 719/328
(58) Field of Classification Search .................. None
See application file for complete search history.

(56) References Cited

U.S. PATENT DOCUMENTS

| | | | | |
|---|---|---|---|---|
| 5,313,616 A * | 5/1994 | Cline et al. | ..................... | 717/127 |
| 5,974,549 A * | 10/1999 | Golan | .............................. | 726/23 |
| 6,754,896 B2 * | 6/2004 | Mishra et al. | .................. | 717/176 |
| 6,874,149 B1 * | 3/2005 | Bermudez et al. | ............ | 719/328 |
| 6,915,513 B2 * | 7/2005 | Duesterwald et al. | ........ | 717/168 |
| 6,928,536 B2 * | 8/2005 | Duesterwald et al. | ........ | 712/226 |
| 6,959,441 B2 * | 10/2005 | Moore | .......................... | 719/328 |
| 7,278,163 B2 * | 10/2007 | Banzhof et al. | .................. | 726/25 |
| 7,496,910 B2 * | 2/2009 | Voskuil | ......................... | 717/168 |
| 7,810,089 B2 * | 10/2010 | Sundarrajan et al. | ......... | 717/174 |
| 8,015,549 B2 * | 9/2011 | Cooper et al. | ................ | 717/124 |
| 2003/0033313 A1 * | 2/2003 | Zweifel et al. | ................ | 707/100 |

(Continued)

OTHER PUBLICATIONS

Fraser, T., et al., "Hardening COTS Software with Generic Software Wrappers", DARPA Information Survivability Conference and Exposition [online], 2000 [retrieved May 2, 2012], Retrieved from Internet: <http://ieeexplore.ieee.org/xpls/abs_all.jsp?arnumber=821530>, pp. 1-15.*

(Continued)

*Primary Examiner* — Don Wong
*Assistant Examiner* — Todd Aguilera
(74) *Attorney, Agent, or Firm* — Harrington & Smith

(57) ABSTRACT

Techniques are disclosed for controlling software patching activity. Techniques may implement a software shell and institute a patching policy to control patching activities. When implemented, the software shell acts as a barrier which permits patching of the underlying software only when the patching activity would be in accordance with the instituted patching policy. Various patching policies can be instituted. Patching may be performed when convenient; or just before when the software requiring the patch is needed; or patching may be blocked to prevent unwanted software characteristics and/or behavior. Patching may be delayed until confidence has been established in a new patch so as to avoid disrupting a computer system that is already functioning in an acceptable manner. A particular software action may be blocked so as to avoid the necessity of having to patch software, particularly when the action may interrupt the orderly function of a computer system.

29 Claims, 6 Drawing Sheets

U.S. PATENT DOCUMENTS

| | | | |
|---|---|---|---|
| 2003/0070162 A1* | 4/2003 | Oshima et al. | 717/171 |
| 2003/0101330 A1* | 5/2003 | Duesterwald et al. | 712/32 |
| 2003/0177394 A1* | 9/2003 | Dozortsev | 713/201 |
| 2004/0015946 A1* | 1/2004 | Te'eni et al. | 717/169 |
| 2004/0040021 A1* | 2/2004 | Bharati et al. | 717/170 |
| 2004/0210653 A1* | 10/2004 | Kanoor et al. | 709/223 |
| 2005/0229173 A1* | 10/2005 | Mihm et al. | 717/171 |
| 2005/0262076 A1* | 11/2005 | Voskuil | 707/8 |
| 2006/0136892 A1* | 6/2006 | Branch et al. | 717/168 |
| 2006/0195840 A1* | 8/2006 | Sundarrajan et al. | 717/176 |
| 2006/0259899 A1* | 11/2006 | Cooper et al. | 717/127 |
| 2007/0169089 A1* | 7/2007 | Bantz et al. | 717/168 |

OTHER PUBLICATIONS

Zhou, J, et al., "Detecting Attacks that Exploit Application-Logic Errors Through Application-Level Auditing", Computer SEcurity Applcations Conference [online], 2004 [retrieved May 2, 2012], Retrieved from Internet: <http://ieeexplore.ieee.org/xpls/abs_all.jsp?arnumber=1377227>, pp. 1-11.*

* cited by examiner

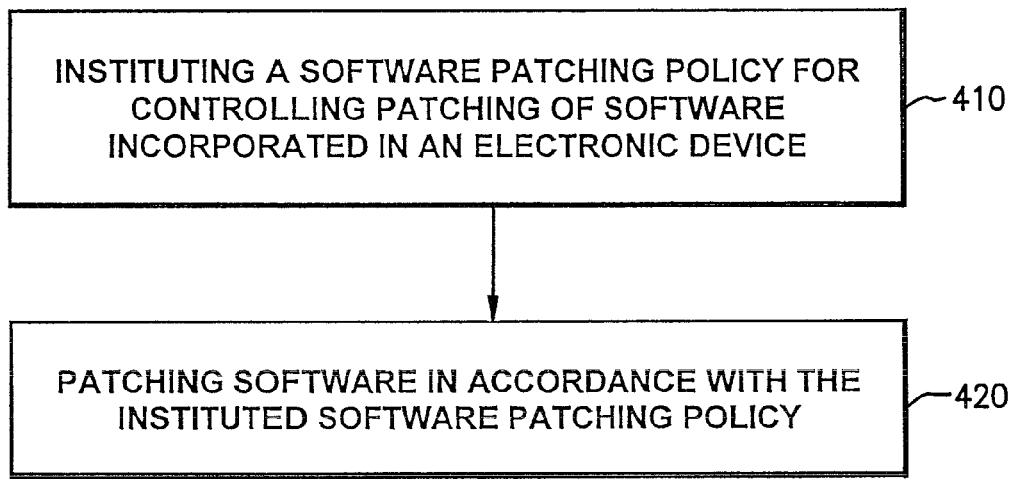
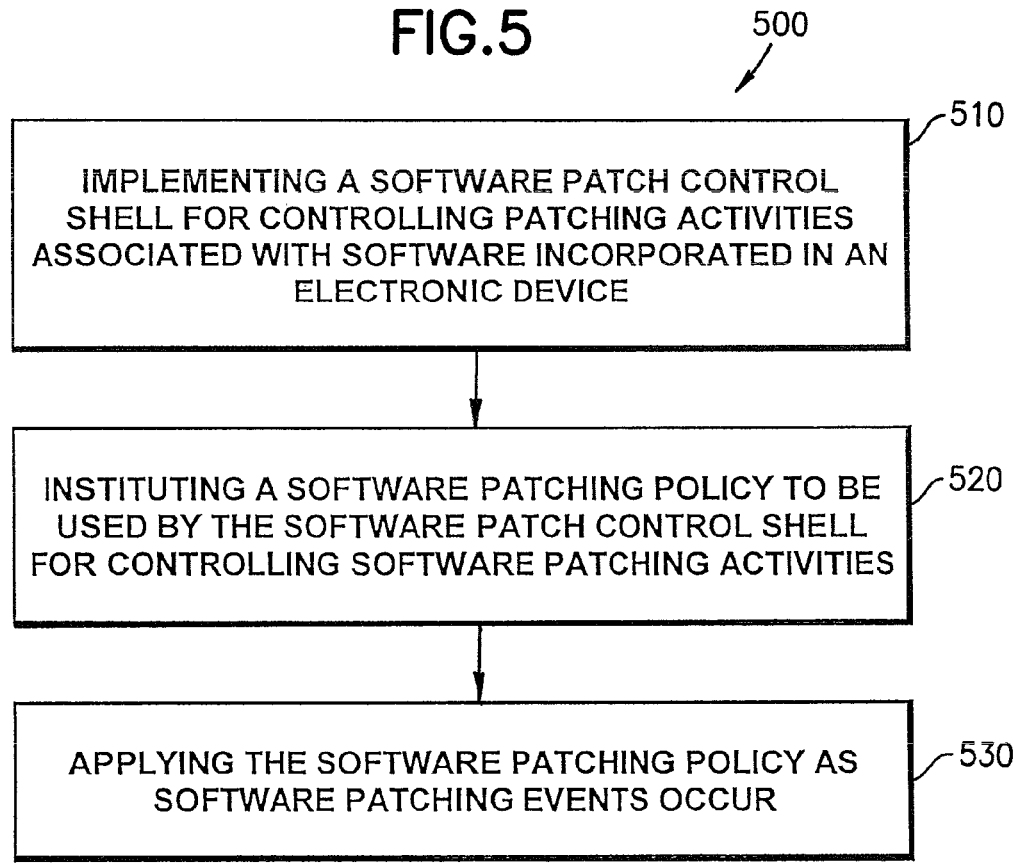

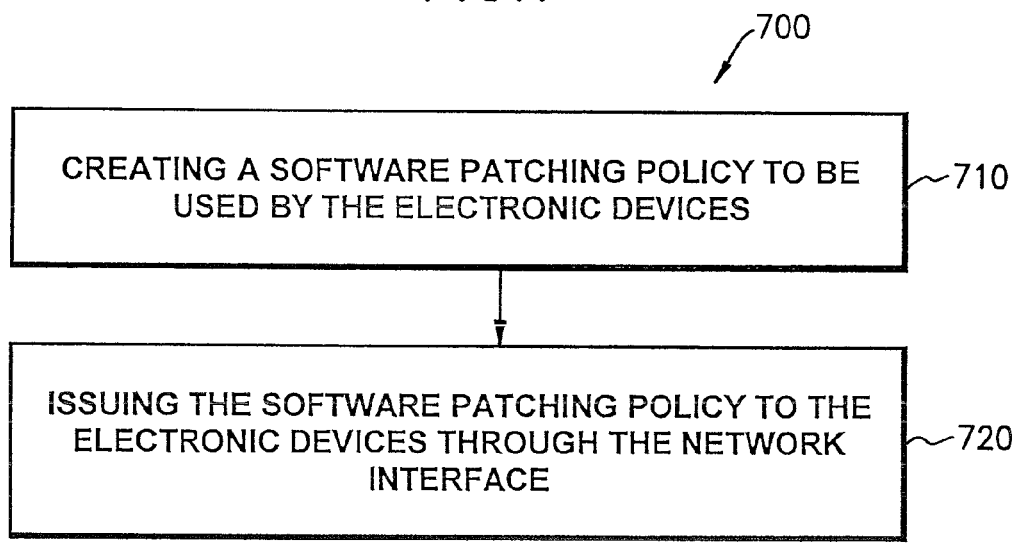

METHODS AND APPARATUS FOR PATCHING SOFTWARE IN ACCORDANCE WITH INSTITUTED PATCHING POLICIES

CROSS REFERENCE TO RELATED APPLICATION

This application is a continuation of U.S. patent application Ser. No. 11/333,064 filed Jan. 17, 2006 now abandoned.

TECHNICAL FIELD

The present invention generally concerns software patching, and more particularly concerns methods and apparatus for implementing both software patching policies and a software shell that controls patching activities so that patching occurs in accordance with instituted patching policies.

BACKGROUND

Over the past decade or so a paradigm has developed governing how complex software including, for example, operating systems and application suites, will be updated. Typically, an operating system or application suite is released ("goes gold") and is assigned one or both of a new name and a version number. Users of the operating system or application suite then typically find software faults ("bugs"), a number of which always seem to survive pre-release testing. Those responsible for the operating system or application suite then release a series of so-called "patches" which eliminate bugs found in the software. For a particularly complex computer program many such patches may be released.

Patching activity frequently occurs in parallel with identification of new and/or enhanced features desired by users of the operating system or application suite, or that are rendered necessary or even mandatory by technological developments. After enough enhancements are identified, developed and beta-tested, the improved operating system or application suite is released as a new product. So a pattern develops of new release, followed by patching activity, followed by new release, followed by patching activity, . . . etc.

When presented with the availability of a new release, users decide whether new features included in the new software release are needed. If not, the user will not acquire the new release. Often, the situation is more complicated, with potential users holding back until first adopters report their experiences with the new release. If a consensus is reached in a user community that features of the new release outweigh drawbacks of the new release (such as, for example, unnecessary modifications to user interfaces which need to be learned; slowdown in overall performance due to increased code size; or overall "buggy" performance of a heretofore stable program), then those potential users holding back will purchase the new release.

The same concerns are reflected in decisions about whether to adopt new patches as they become available. Most user populations are aware of so-called "horror stories" that accompany the reflexive and unthinking adoption of any and all software patches. For example, an application suite which previously operated in a responsive mariner may now function in a less-responsive manner due to a resource-intensive software patch. In other situations, the software patch may result in instability—"crashes"—when code associated with the patch is executed. It is not unusual for some users to have the feeling that they have become unwitting members in a beta testing program for the patch.

Such outcomes are particularly troubling when users realize after-the-fact that the applied patch concerned "improvements" to functionality that they may rarely, or never, use. It is well-known in the art of computer software that particular users will rarely employ all of the functionality of a software system. Rather, the full functionality of a software system is required in order to address a cross-section of needs reflected in a target market. Accordingly, it is often the case that a patch may fix a problem in functionality that is seldom, or never, used by a particular user.

When viewed from the perspective of a large corporation, reflexive and unthinking patching activity may result in numerous inefficiencies when the activities associated with adopting a patch are aggregated across a corporation. A given patch consumes resources in several ways: it may take network bandwidth to download, storage space to store and computational cycles to install. Often more importantly, the time and energy of a system user may be needed to decide whether to install the patch and, if the user decides to do so, to direct installation of the patch. Decisions about the advisability of installing a patch may depend on information which is not in the user's possession, requiring the user to search for the information. The patch, when installed, may reduce the performance of the software system, resulting in many users undoing the patch thereby incurring further inefficiencies.

Thus, those skilled in the art desire improved methods and apparatus for controlling software patching activities. In particular, those skilled in the art desire methods and apparatus for implementing control over patching activities. Further, those skilled in the art desire methods and apparatus for providing software functionality capable of performing software patching activity in accordance with decisions made about when to patch.

SUMMARY OF THE PREFERRED EMBODIMENTS

A first embodiment of the invention comprises a signal-bearing medium tangibly embodying a program of machine-readable instructions executable by a digital processing apparatus of an electronic device to perform operations for controlling software patching activities, the operations comprising: instituting a software patching policy for controlling patching of software incorporated in the electronic device; and patching software in accordance with the instituted software patching policy A second embodiment of the invention comprises a signal-bearing medium tangibly embodying a program of machine-readable instructions executable by a digital processing apparatus of an electronic device to perform operations for controlling software patching activities, the operations comprising: implementing a software patch control shell for controlling patching activities associated with software incorporated in the electronic device; instituting a software patching policy to be used by the software patch control shell for controlling software patching activities; and applying the software patching policy as potential software patching opportunities occur.

A third embodiment of the invention comprises a system for managing software patching activity, the system comprising a software patching activity manager, the software patching activity manager comprising: at least one memory to store at least one program of machine-readable instructions, where the at least one program performs operations for instituting and controlling a software patching policy; a network interface for use in communicating over a network with a source of software patches and with electronic devices subject to the software patching policy; at least one processor coupled to the at least one memory and network interface, where the at least one processor performs at least the following operations when the at least one program is executed: creating a software patching policy to be used by the electronic devices; and issuing the software patching policy to the electronic devices through the network interface.

A fourth embodiment of the invention comprises a system for managing software patching activity, the system comprising a software patching activity manager, the software patching activity manager comprising: at least one memory to store at least one program of machine-readable instructions, where the at least one program performs operations for instituting and controlling a software patching policy; a network interface for use in communicating over a network with a source of software patches and with electronic devices subject to the software patching policy; at least one processor coupled to the at least one memory and network interface, where the at least one processor performs at least the following operations when the at least one program is executed: creating a software patching policy to be used by the electronic devices; and issuing the software patching policy to the electronic devices through the network interface.

In conclusion, the foregoing summary of the alternate embodiments is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4 depicts a method operating in accordance with the invention;

FIG. 5 depicts another method operating in accordance with the invention;

FIG. 7 depicts yet another method operating in accordance with the present invention.

DETAILED DESCRIPTION OF THE PREFERRED EMBODIMENTS

Figure 1:
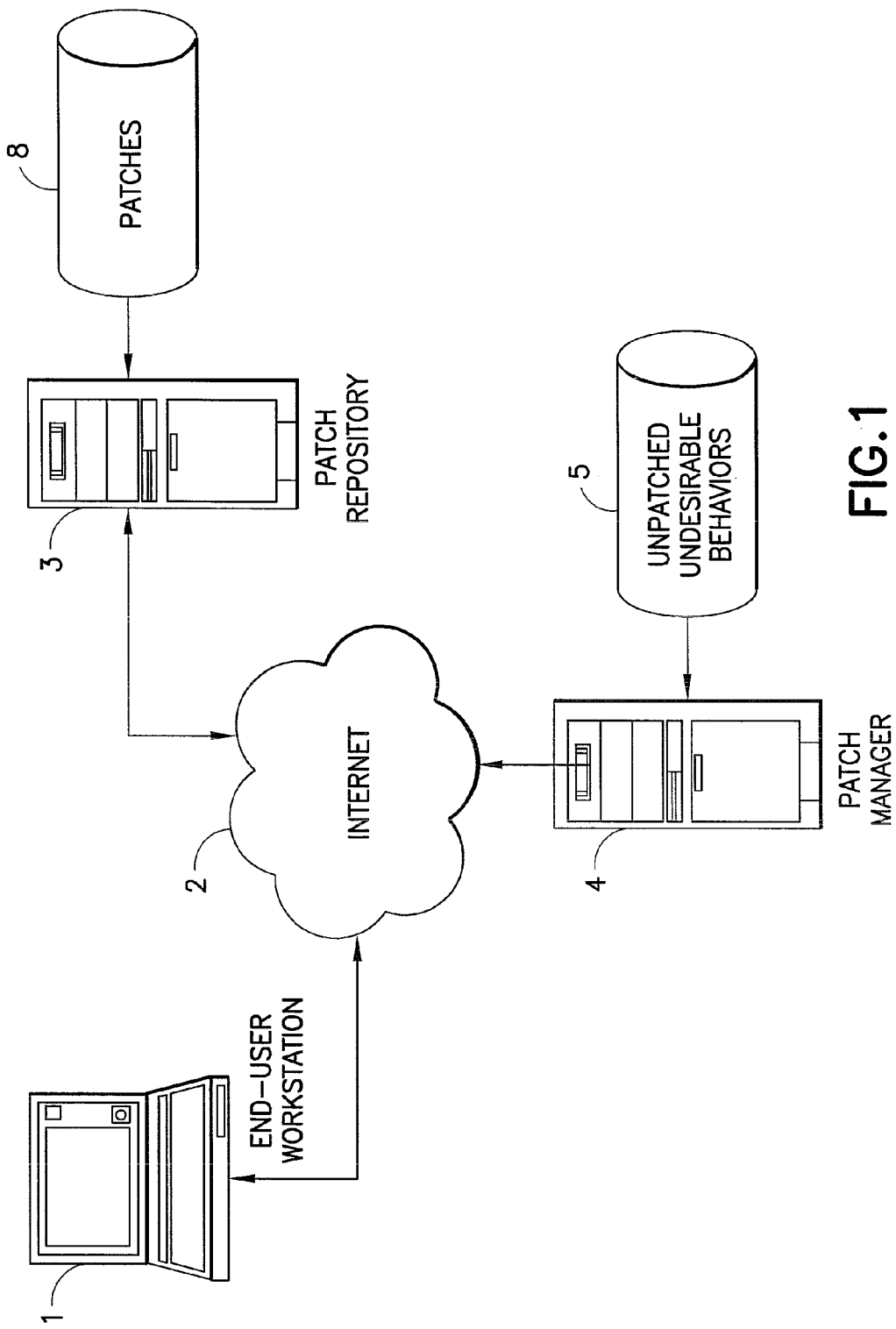
FIG. 1 illustrates the disposition of the elements of a system embodying the subject invention.

FIG. 1 illustrates a system embodying the subject invention. End-user workstation 1 contains software subject to patching. It is to be noted that the subject invention does not apply only to end-user workstation software, but to software on servers, software on personal devices and embedded software on dedicated devices such as automobiles, routers and kitchen appliances. A path exists from end-user workstation 1 to the Internet 2, through which communication may be established to patch repository computer 3 and patch manager computer 4. Server 3 has attached storage device 8 containing the contents of one or more patches, while service manager computer 4 has attached storage device 5 containing information relating to the circumstances needing a patch. These circumstances are represented as a syndrome of use of a specific system component, that syndrome indicative of behavior of the system component for which a patch exists. For example, suppose that the system component were the software responsible for communication using the TCP/IP protocol suite, and that there is an error in the implementation of the secure sockets layer (SSL) component of that suite, for which a patch exists. Then the syndrome of use is a particular invocation of the application programming interface (API) of the TCP/IP protocol suite implementation, such that the invocation initiates communication using SSL. The syndrome may be as simple as the name of the entry point into the TCP/IP protocol suite and the values of the arguments passed through the entry point.

Figure 2B:
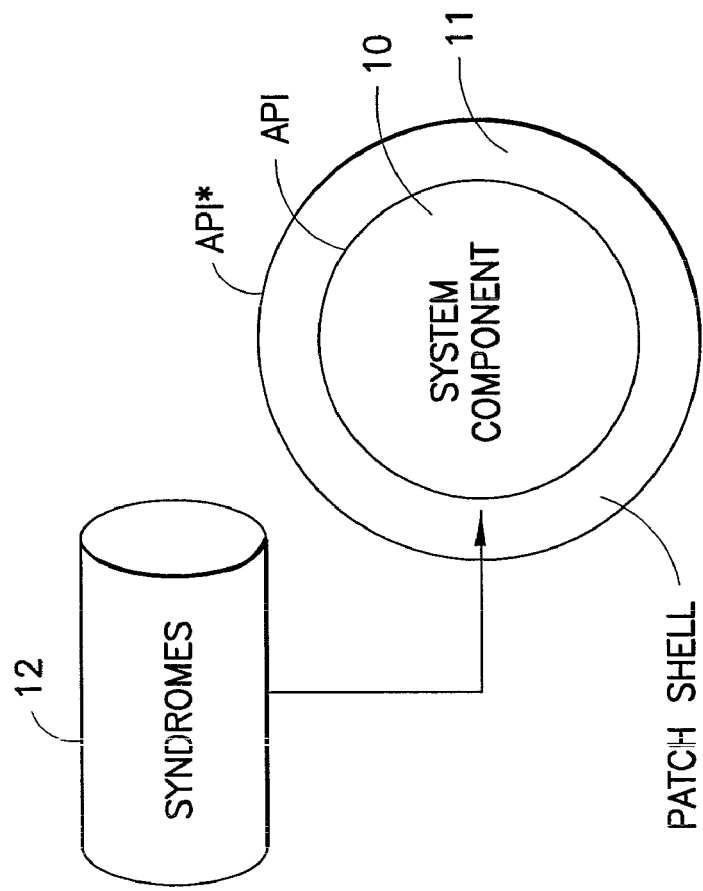
FIG. 2A is a schematic illustration of a system operating in accordance with the prior art and FIG. 2B is a schematic illustration of a system operating in accordance with the invention.
Figure 2A:
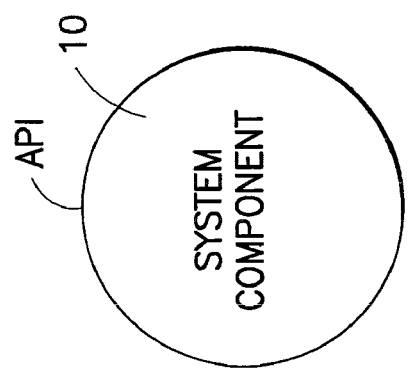

FIG. 2A is a schematic diagram illustrating a system component operating in accordance with the prior art and FIG. 2B is a schematic diagram illustrating a system component operating in accordance with the present invention. In FIG. 2A is shown a system component 10 with its API. In FIG. 2B is shown a system component 10 with its API, embedded in a new software component, the patch shell 11. The API to the patch shell, shown as API*, is a strict superset of the API to the system component: that is, it contains all of the entry points to the system component API, with some additional entry points. The patch shell 11 communicates with a database of syndromes 12. The features associated with patch shell depicted in FIG. 2B are a particular advantage of the present invention and will be described in greater detail.

It can be seen from the figure and the description above that any use of system component 10 can be accomplished with equivalent use of patch shell 11. In fact, some of the entry points to the API of the patch shell may be identical to the entry points to the API of the system component. Those that are not are said to be "monitored." Monitored API calls are first checked by the patch shell to see if they match any invocation syndromes. If they do, it may be the case that this call invokes behavior for which a patch exists, but where the patch has not yet been applied. Not shown in FIG. 2 is reference by the patch shell to a policy database which controls what to do in this situation.

Figure 3:
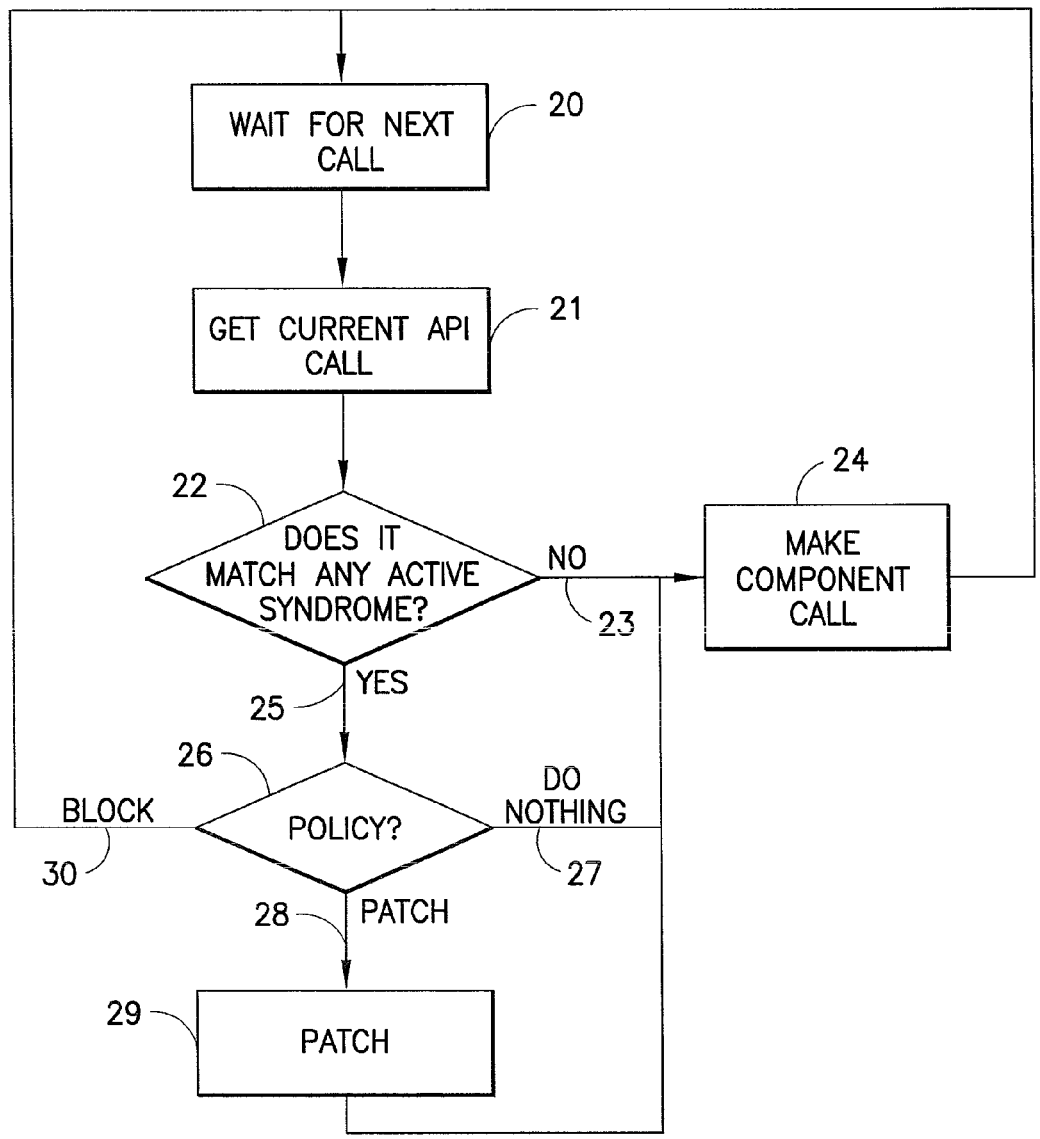
FIG. 3 is a flow diagram describing the processing performed by the patch shell.

FIG. 3 is a flow diagram that illustrates the processing performed by the patch shell. The patch shell is a monitor that is invoked when a call is made to its API; thus it is shown in the figure as executing continuously. In block 20 the patch shell waits for the next invocation of a monitored entry point of the system component's API. In block 21 the arguments and identity of the entry point are captured, and in the decision block 22 these are compared to active syndromes for that system component. If the current call does not match any syndrome, branch 23 is taken to block 24 which makes the equivalent call directly to the system component's API, and then block 20 is re-entered to wait for the next call.

If the current call does match an active syndrome, branch 25 is taken to decision block 26 which determines the policy for that syndrome. If the policy is to do nothing, branch 27 is taken to block 24 previously described. If the policy is to block the API call branch 30 is taken to block 20, effectively ignoring the API call. If the policy is to patch, branch 28 is taken to block 29 which installs the necessary patch. When that installation is complete, block 24 is entered, as previously described.

Many forms of this invention are possible. In a preferred form, syndromes, patch shells, policies and patches are installed and managed by a service. As previously noted, the invention applies to all types of computing devices. The invention is not limited to the policies given here. In particular, a policy may be to notify an end user or administrator to get their input before installing the patch. Patches may be applied if there are more than k invocations of the behavior, where k is a parameter.

Alternate methods operating in accordance with the present invention will now be described with reference to FIGS. 4-7. FIG. 4 depicts a method 400 generally applicable to an electronic device having a software suite requiring occasional patching. At step 410, a digital processing apparatus incorporated in the electronic device executes a software program that institutes a software patching policy for controlling patching of software comprising the software suite. The computer program implementing the software patching policy typically runs continuously. When an opportunity for patching the software comprising the software suite arises, the computer program patches the software in accordance with the software patching policy at step 420.

In one variant of the method depicted in FIG. 4, the software patching policy allows a particular software patch to be implemented only if it is established that a user of the electronic device actually uses a software feature that requires the particular software patch. In another variant of the method depicted in FIG. 4, the software patching policy allows a particular software patch to be implemented only at times that are convenient for the user of the electronic device. In a further variant of the method depicted in FIG. 4, a software patch will be implemented on as-needed basis. In other words, application of a particular software patch will be held in abeyance until a time when a user of the electronic device has indicated that a software feature which requires the particular software patch will be used for a first time since the issuance of the particular software patch.

In yet another variant of the method depicted in FIG. 4, the software patching policy is instituted on a category basis, wherein certain categories of software patches will be implemented and certain categories of software patches will be blocked.

In a still further variant of the method depicted in FIG. 4 additional steps are performed. In one additional step, information is received that a particular patch which is otherwise desirable has a deleterious effect on operations of the electronic device only when a particular software feature is used. In another step, the implementation of the particular software patch is permitted. In a still further step, use of the particular software feature which causes the deleterious effect when using software which has implemented the particular patch is blocked.

In another variant of the method depicted in FIG. 4, if it is determined that a particular software patch will not be implemented, then an additional step is performed to block use of the software feature requiring the particular patch. This aspect of the present invention can be used when both the present state of the software without the patch and the patch itself are particularly problematic. For instance, neither the un-patched software feature nor the patch may operate in a satisfactory fashion.

In a further variant of the method depicted in FIG. 4, the software patching policy that is implemented at 410 may permit a second software patch to be substituted for a first software patch. This will accommodate situations where an improved patch has been developed as a substitute for a patch that has already been approved for installation.

Another method 500 capable of operating in accordance with the present invention is depicted in FIG. 5. The method depicted in FIG. 5 is intended for use by an electronic device having a software suite which requires occasional patching. When the method is incorporated in a computer program and the computer program executed the operations depicted in FIG. 5 are performed. At step 510, the computer program embodying the method implements a software patch control shell for controlling software patching activities associated with software incorporated in an electronic device. Next, at step 520, a software patching policy to be used by the software patch control shell for controlling software patching activities is instituted. Then, at step 530, the software patch control shell applies the software patching policy as software patching events occur. Generally, software patching events occur as a source of software patches issues new software patches. Various software patching policies may be implemented in the method depicted in FIG. 5, including policies similar to those described with respect to FIG. 4.

Figure 6:
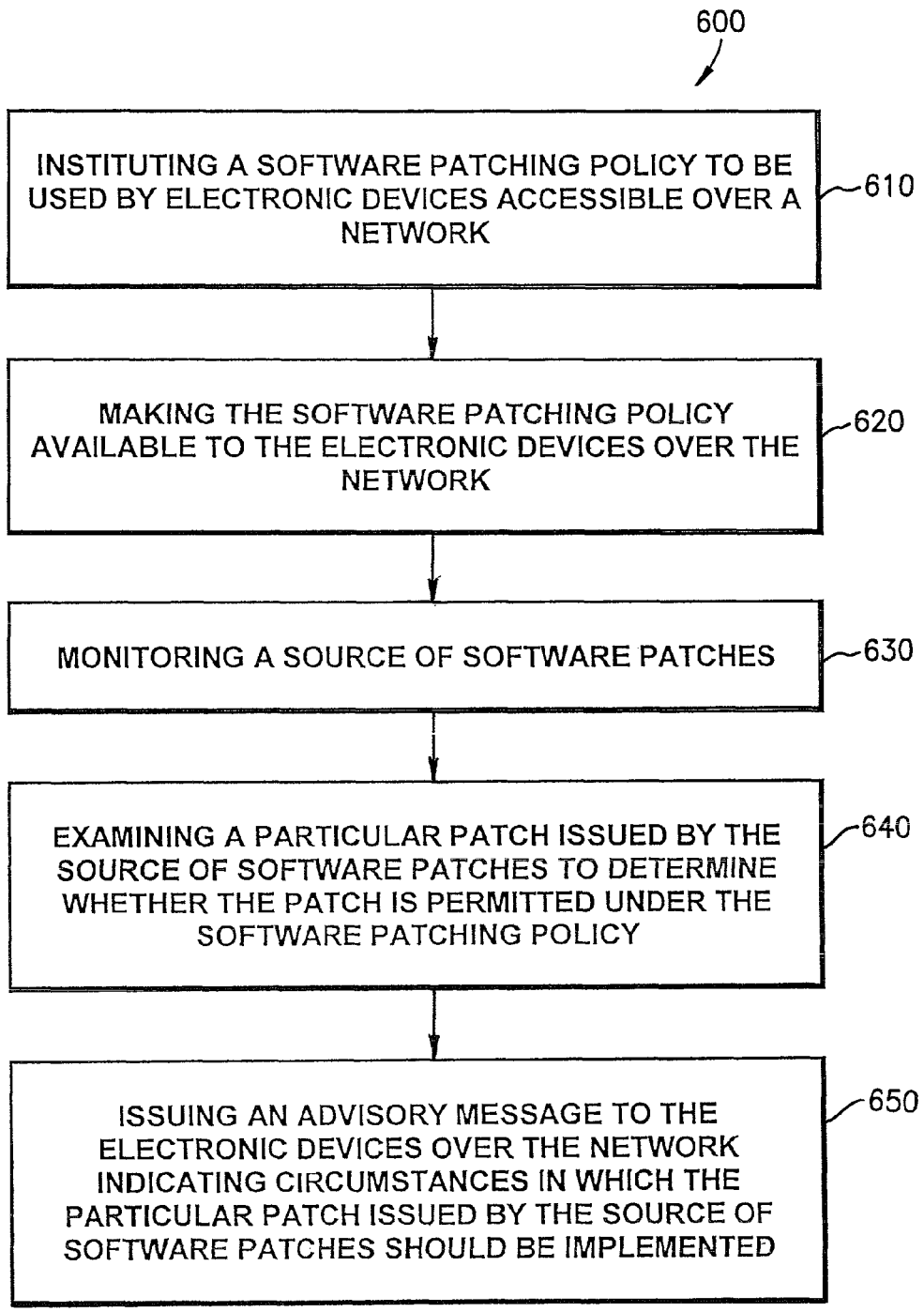
FIG. 6 depicts a further method operating in accordance with the invention.

A further method 600 depicted in FIG. 6 is intended for use by a software patching activity manager like the patch manager 4 depicted in FIG. 1. In the method at step 610, the software patching activity manager institutes a software patching policy to be used by electronic devices accessible over a network in deciding whether to implement a patch. Then at step 620, the software patching activity manager makes the software patching policy available to the electronic devices over the network. Next, at step 630, the software patching activity manager monitors a source of software patches. Then, at step 640, the software patching activity manager examines a particular patch issued by the source of software patches to determine whether the patch is permitted under the software patching policy. Next, at step 650, the software patching activity manager issues an advisory message to the electronic devices over the network indicating circumstances in which the particular patch issued by the source of software patches should be implemented.

In variants of the method depicted in FIG. 6, various software patching policies may be implemented similar to those described with respect to FIGS. 4 and 5.

Yet another method operating in accordance with the present invention is also intended for use by a software patching activity manager like patch manager 4 depicted in FIG. 1. In the method 700 depicted in FIG. 7, the software patching activity manager creates a software patching policy to be used by electronic devices having software suites that require occasional patching at step 710. Then, at step 720, the software patching activity manager issues the software patching policy to the electronic devices over a network.

In a variant of the method depicted in FIG. 7, the step of creating a software patching policy further comprises additional steps. In a first additional step, the software patching activity manager analyzes patches available at the source of software patches. Then, in another step, the software patching activity manager determines which patches should be instituted in the electronic devices subject to the software patching policy. In other variants, determining which patches should be instituted in the electronic devices subject to the software patching policy comprises additional steps. These steps may comprise gathering information concerning operational experiences with patches available at the source of software patches; and adopting particular software patches for implementation by the electronic devices subject to the patching policy only if operational experiences with particular patches meet at least one predetermined criterion. Many predetermined criteria may be adopted in accordance with the invention such as, for example, a maximum acceptable number of faulty installations of the patch to be expected if the patch is adopted, a maximum acceptable number of new but undesirable behaviors that the patched software now exhibits; a maximum acceptable time required to install the software patch; maximum acceptable level of resources required to implement the patch, etc.

In another variant of the method depicted in FIG. 7 the following additional operations are performed: monitoring the source of software patches for new patches as new patches become available; detecting a new patch; examining the new patch issued by the source of software patches to determine whether the patch is permitted under the software patching policy; and issuing an advisory message to the electronic devices indicating circumstances in which the new patch issued by the source of software patches should be implemented, if at all. Before issuing an advisory message, still further steps may be taken in this variant of the method depicted in FIG. 7. In one such variant the following additional operations are performed: before issuing the advisory message, monitoring sources reporting experiences with the new patch; and issuing an advisory message allowing implementation of the new software patch in the electronic devices subject to the patching policy only if reported experiences with the new patch meet at least one predetermined criterion. In another such variant the following additional operations are performed: before issuing the advisory message, performing a cost-benefit analysis of the new patch by comparing costs and benefits associated with implementation of the new patch; and issuing an advisory message allowing implementation of the new software patch in the electronic device only if the new patch meets at least one predetermined cost-benefit criterion. Various cost-benefit criteria may be used such as, for example, user time necessary to implement the new patch; cost of bandwidth necessary to download the new patch; storage space required to store the new patch; and user time necessary to undo the new patch if the patch is determined to be faulty.

One of ordinary skill in the art will understand that the methods depicted and described herein can be embodied in a tangible machine-readable memory medium. A computer program fixed in a machine-readable memory medium and embodying a method or methods of the present invention perform steps of the method or methods when executed by a digital processing apparatus coupled to the machine-readable memory medium. Tangible machine-readable memory media include, but are not limited to, hard drives, CD-or DVD-ROM, flash memory storage devices or in a RAM memory of a computer system.

Thus it is seen that the foregoing description has provided by way of exemplary and non-limiting examples a full and informative description of the best method and apparatus presently contemplated by the inventors for patching software in accordance with instituted patching policies. One skilled in the art will appreciate that the various embodiments described herein can be practiced individually; in combination with one or more other embodiments described herein; or in combination with computer systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A storage medium tangibly embodying a program of machine-readable instructions executable by a digital processing apparatus of an electronic device to perform operations for controlling software patching activities, the operations comprising:

implementing a software patch control shell for controlling patching activities associated with a system component implemented at least in part via software comprising an application programming interface, the system component incorporated in the electronic device, the software patch control shell comprising one or more entry points of the application programming interface;

instituting a software patching policy to be used by the software patch control shell for controlling software patching activities; and applying the software patching policy as potential software patching opportunities occur, wherein applying further comprises the software patch control shell performing the following:

monitoring particular calls to the one or more entry points of the application programming interface, wherein monitoring comprises capturing arguments and identities of the one or more entry points;

determining whether a particular call matches any syndromes indicative of behavior of the system component for which a patch exists, wherein determining comprises comparing the captured arguments and identities to active syndromes for the system component;

in response to the particular call matching a syndrome, installing a patch corresponding to the syndrome and, after installation of the patch, making the particular call to the entry point of the application programming interface.

2. The storage medium of claim 1 wherein the software patching policy allows a particular software patch to be installed only if it is established that a user of the electronic device actually uses a software feature that requires the particular patch.

3. The storage medium of claim 1 wherein the software patching policy allows a particular software patch to be installed only at a time that is convenient for a user of the electronic device.

4. The storage medium of claim 1 wherein the software patching policy allows a particular patch to be installed only at a time when a user of the electronic device has indicated that a software feature which requires the particular software patch will be used for a first time since the particular patch became available.

5. The storage medium of claim 1 where the software patching policy is instituted on a category basis, wherein certain categories of software patches will be installed and certain categories of software patches will be blocked.

6. The storage medium of claim 1 where the operations further comprise:

receiving information that a particular patch which is otherwise desirable has a deleterious effect on operations of the electronic device only when a particular software feature is used;

permitting installation of the particular patch; and blocking use of the particular software feature which causes the deleterious effect when using software which has installed the particular patch.

7. The storage medium of claim 1, wherein the software patch control shell further performs the following:

in response to a second particular call matching a second syndrome, determining if a policy indicates one of a patch should be installed, the second particular call should be blocked, or the second particular call should be performed;

in response to the policy indicating the patch should be installed, installing the patch corresponding to the second syndrome and, after the patch, making the second particular call to the entry point of the application programming interface;

in response to the policy indicating the second particular call should be blocked, blocking the second particular call to the entry point of the application programming interface; and in response to the policy indicating the second particular call should be performed, performing the second particular call without installing the patch corresponding to the second syndrome.

8. The storage medium of claim 1, wherein the software patch control shell comprises all of the entry points to the application programming interface of the system component.

9. The storage medium of claim 1, wherein the syndrome comprises a name of a particular entry point and one or more values of arguments passed through a particular entry point, the monitoring further comprises capturing names of the one or more entry points and values of arguments passed through the one or more entry points, and wherein determining whether a particular call matches any syndromes indicative of behavior of the system component for which a patch exists further comprises determining whether any of the captured names match the name of the particular entry point and whether captured one or more values of the arguments match corresponding one or more values of the arguments passed through the particular entry point.

10. The storage medium of claim 1, wherein monitoring particular calls further comprise monitoring only some of the entry points to the application programming interface and not monitoring others of the entry points to the application programming interface.

11. A storage medium tangibly embodying a program of machine-readable instructions executable by a digital processing apparatus of an electronic device to perform operations for instituting and controlling a software patching policy, the operations comprising:

instituting a software patching policy to be used by electronic devices accessible over a network;

making a software patch control shell available to the electronic devices over the network, the software patch control shell to be installed by the electronic devices incorporating a system component implemented at least in part via software comprising an application programming interface, the software patch control shell configured to comprise one or more entry points of the application programming interface;

making the software patching policy available to the electronic devices over the network, and the software patch control shell is configured to perform:

monitoring particular calls to the one or more entry points of the application programming interface, wherein monitoring comprises capturing arguments and identities of the one or more entry points;

determining whether a particular call matches any syndromes indicative of behavior of the system component for which a patch exists, wherein determining comprises comparing the captured arguments and identities to active syndromes for the system component; and in response to the particular call matching a syndrome, installing a patch corresponding to the syndrome and, after installation of the patch, making the particular call to the entry point of the application programming interface;

monitoring a source of software patches;

examining a particular patch issued by the source of software patches to determine whether the patch is permitted under the software patching policy; and issuing an advisory message to the electronic devices over the network indicating circumstances in which the particular patch issued by the source of software patches should be implemented.

12. The storage medium of claim 11 wherein the software patching policy allows a particular software patch to be installed only if it is established that a particular user of an electronic device potentially subject to the particular patch actually uses a software feature that requires the particular software patch.

13. The storage medium of claim 11 wherein the software patching policy allows a particular software patch to be installed only at a time that is convenient for a user of the electronic device.

14. The storage medium of claim 11 wherein the software patching policy allows a particular software patch to be installed only at a time when a user of a particular electronic device has indicated that a software feature which requires the particular software patch will be used for a first time since the particular software patch became available.

15. A system for managing software patching activity, the system comprising a software patching activity manager, the software patching activity manager comprising:

at least one memory to store at least one program of machine-readable instructions, where the at least one program performs operations for instituting and controlling a software patching policy;

a network interface for use in communicating over a network with a source of software patches and with electronic devices subject to the software patching policy;

at least one processor coupled to the at least one memory and network interface, where the at least one processor performs at least the following operations when the at least one program is executed:

creating a software patching policy to be used by the electronic devices;

making a software patch control shell available to the electronic devices over the network, the software patch control shell to be installed by the electronic devices incorporating a system component implemented at least in part via software comprising an application programming interface, the software patch control shell configured to comprise one or more entry points of the application programming interface; and issuing the software patching policy to the electronic devices through the network interface, and the software patch control shell is configured to perform:

monitoring particular calls to the one or more entry points of the application programming interface, wherein monitoring comprises capturing arguments and identities of the one or more entry points;

determining whether a particular call matches any syndromes indicative of behavior of the system component for which a patch exists, wherein determining comprises comparing the captured arguments and identities to active syndromes for the system component; and in response to the particular call matching a syndrome, installing a patch corresponding to the syndrome and, after installation of the patch, making the particular call to the entry point of the application programming interface.

16. The system of claim 15 wherein creating a software patching policy further comprises:
   analyzing patches available at the source of software patches; and
   determining which patches should be instituted in the electronic devices subject to the software patching policy.

17. The system of claim 16 wherein determining which patches should be instituted further comprises:
   gathering information concerning operational experiences with patches available at the source of software patches; and
   adopting particular software patches for implementation by the electronic devices subject to the software patching policy only if operational experiences with particular patches meet at least one predetermined criterion.

18. The system of claim 15 wherein the operations further comprise:
   monitoring the source of software patches for new patches as new patches become available;
   detecting a new patch;
   examining the new patch issued by the source of software patches to determine whether the patch is permitted under the software patching policy; and
   issuing an advisory message to the electronic devices over the network indicating circumstances in which the new patch issued by the source of software patches should be implemented, if at all.

19. The system of claim 18 wherein the operations further comprise:
   before issuing the advisory message, monitoring sources reporting experiences with the new patch; and
   issuing an advisory message allowing implementation of the new software patch in the electronic devices only if reported experiences with the new patch meet at least one predetermined criterion.

20. The system of claim 18 wherein the operations further comprise:
   before issuing the advisory message, performing a cost-benefit analysis of the new patch by comparing costs and benefits associated with implementation of the new patch; and
   issuing an advisory message allowing implementation of the new software patch in the electronic device only if the new patch meets at least one predetermined cost-benefit criterion.

21. The system of claim 20 wherein a cost associated with implementation of the software patch analyzed by the software patching activity manager is selected from the group comprised of: user time to implement the new patch; cost of bandwidth to download the new patch; storage space required to store the new patch; and user time necessary to undo the new patch if the patch is determined to be faulty.

22. The system of claim 15 wherein the software patching policy allows later software patches to be substituted for earlier software patches.

23. The system of claim 15 further comprising an electronic device subject to the software patching policy, the electronic device further comprising:
   at least one memory to store at least one program of machine-readable instructions, where the at least one program performs operations for implementing the software patching policy issued by the software patching activity manager;
   a network interface for use in communicating over a network with the software patching activity manager and the source of software patches;
   at least one processor coupled to the at least one memory and the network interface, where the at least one processor performs at least the following operations when the at least one program is executed:
   receiving the software patching policy issued by the software patching activity manager; and
   performing software patching activities of software incorporated in the electronic device in accordance with the software patching policy issued by the software patching activity manager, wherein performing software patching activities further comprises installing and executing the software patch control shell.

24. An apparatus, comprising:
   at least one memory to store at least one program of machine-readable instructions;
   at least one processor coupled to the at least one memory, where the at least one processor performs at least the following operations when the at least one program is executed:
   implementing a software patch control shell for controlling patching activities associated with a system component implemented at least in part via software comprising an application programming interface, the system component incorporated in the electronic device, the software patch control shell comprising one or more entry points of the application programming interface;
   instituting a software patching policy to be used by the software patch control shell for controlling software patching activities; and
   applying the software patching policy as potential software patching opportunities occur, wherein applying further comprises the software patch control shell performing the following:
      monitoring particular calls to the one or more entry points of the application programming interface, wherein monitoring comprises capturing arguments and identities of the one or more entry points;
      determining whether a particular call matches any syndromes indicative of behavior of the system component for which a patch exists, wherein determining comprises comparing the captured arguments and identities to active syndromes for the system component; and
      in response to the particular call matching a syndrome, installing a patch corresponding to the syndrome and, after installation of the patch, making the particular call to the entry point of the application programming interface.

25. The apparatus of claim 24 wherein the software patching policy allows a particular software patch to be installed only if it is established that a user of the electronic device actually uses a software feature that requires the particular patch.

26. The apparatus of claim 24 wherein the software patching policy allows a particular software patch to be installed only at a time that is convenient for a user of the electronic device.

27. The apparatus of claim 24 wherein the software patching policy allows a particular patch to be installed only at a time when a user of the electronic device has indicated that a software feature which requires the particular software patch will be used for a first time since the particular patch became available.

28. The apparatus of claim 24 where the software patching policy is instituted on a category basis, wherein certain categories of software patches will be installed and certain categories of software patches will be blocked.

29. The apparatus of claim 24 where the operations further comprise:

receiving information that a particular patch which is otherwise desirable has a deleterious effect on operations of the electronic device only when a particular software feature is used;

permitting installation of the particular patch; and blocking use of the particular software feature which causes the deleterious effect when using software which has installed the particular patch.

* * * * *